United States Patent [19]

Stolz

[11] 4,151,634

[45] May 1, 1979

[54] PLATE CONNECTOR FOR CONVEYOR BELTS AND METHOD FOR SECURING SUCH PLATE CONNECTOR TO CONVEYOR BELTS

[75] Inventor: Hermann Stolz, Muehlheim am Main, Fed. Rep. of Germany

[73] Assignee: MATO Maschinen- und Metallwarenfabrik Curt Matthaei Gesellschaft mit beschraenkter Haftung and Co. KG, Offenbach am Main, Fed. Rep. of Germany

[21] Appl. No.: 802,126

[22] Filed: May 31, 1977

[30] Foreign Application Priority Data

Jun. 12, 1976 [DE] Fed. Rep. of Germany ....... 2626443

[51] Int. Cl.$^2$ ............................................. B23P 11/00
[52] U.S. Cl. .................... 29/509; 29/526 R; 29/243.51
[58] Field of Search ............ 29/509, 513, 526, 243.51, 29/243.58, 432.1, 798; 227/79, 155; 140/93 D, 105; 74/231 J, 235; 198/698, 699; 24/31 B, 33 F, 33 B, 36

[56] References Cited

U.S. PATENT DOCUMENTS

| 2,935,774 | 5/1960 | Shick | 24/33 B |
|---|---|---|---|
| 2,984,119 | 5/1961 | Jenkins et al. | 74/231 J |
| 2,990,734 | 7/1961 | Jackson | 24/33 B |
| 3,034,382 | 5/1962 | Hazel | 227/79 |
| 3,101,481 | 8/1963 | Neale | 29/526 |
| 3,581,350 | 6/1971 | McComb | 29/243.51 |

*Primary Examiner*—Michael J. Keenan
*Attorney, Agent, or Firm*—W. G. Fasse; W. W. Roberts

[57] ABSTRACT

Plate connectors are secured to the free ends of belts, such as conveyor belts, by means of staples, the protruding ends of which are bent over. Preferably, there are recesses at least in one outer surface of the plate connector. The bent over ends of the staples are preferably cut-off in a plane corresponding substantially to the outer surface of the plate connector, whereby a portion of the bent over staple end is received in its respective recess. The recesses may, however, also be shaped and sized so as to hold the entire bent over end of the staples without severing the ends.

13 Claims, 12 Drawing Figures

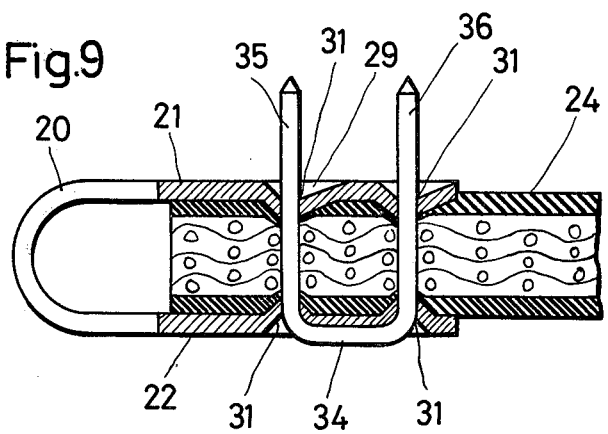
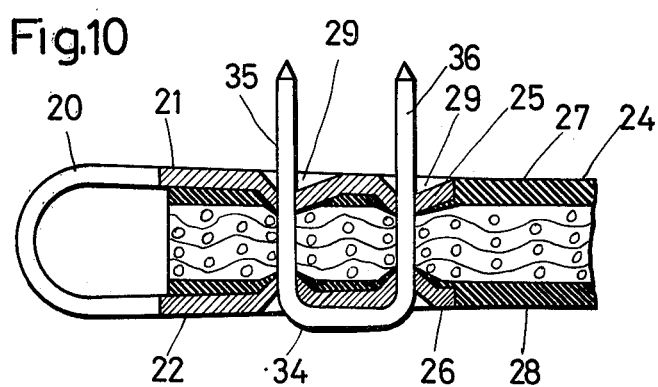
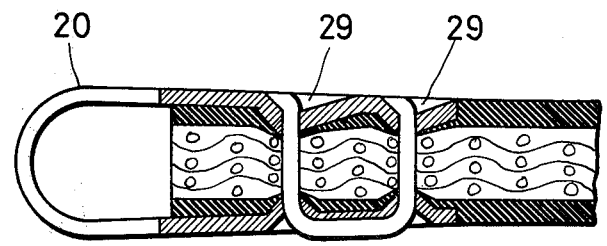

PLATE CONNECTOR FOR CONVEYOR BELTS AND METHOD FOR SECURING SUCH PLATE CONNECTOR TO CONVEYOR BELTS

BACKGROUND OF THE INVENTION

The invention relates to a plate connector especially for conveyor belts. Such plate connectors may be secured to the free ends of a belt for interconnecting such belt ends. The invention also relates to a method for securing such plate connectors to the belt ends especially of conveyor belts.

Plate connectors of this type are known and are secured to the belt ends by means of staple type clamps which, in the following context, will be referred to as connector elements. It is also known to use rivets for connecting the plate connectors to the belt ends. Where staples or connector elements are used the free ends of the connector elements extend through the plate connectors as well as through the belt end and protrude above the surface of the plate connector, whereby the anchoring is accomplished by bending over the protruding ends of the connector element. However, experience has shown that the free ends of the connector elements may easily be bent upwardly again, whereby not only the strength of the connection is impaired, but which even may cause accidents, especially where the conveyor belts are employed in the conveying of persons, for example, in airports or the like.

OBJECTS OF THE INVENTION

In view of the above, it is the aim of the invention to achieve the following objects, singly or in combination:

to improve the bent over type of connection between the belt end and a plate connector in such a manner that an opening or upward bending of the bent over end of a connector element is avoided;

to construct the interconnection of a plate connector with a belt end by means of staples in such a manner that the connection is substantially equal to a riveted connection;

to provide recesses in the surface of a leg of a plate connector, of such a shape that the bent over end of a staple or connector element may be completely received in such recess or at least to such an extent that after severing a portion of the bent over end will remain recessed while still providing sufficient holding strength; and to bias the legs of the plate connector so that they converge toward the conveyor belt surface or that at least a portion of the plate connector leg or legs converges toward the belt surface.

SUMMARY OF THE INVENTION

According to the invention there is provided a method for securing plate connectors to belt ends by means of staples, the free ends of which are inserted through the legs of the plate connector and through the belt end which is received between the legs of the U-shaped connector, whereupon the protruding staple ends are bent over through an angle $\alpha$ relative to the plane of the belt and that after the bending the bent ends are severed in a plane substantially coinciding with the surface of the plate connector leg.

In this particular embodiment the free ends of the connector elements or staples are bent only to a limited extent until a secure anchoring is assured because a portion of the bent over end is securely received in a recess of the plate connector leg after the severing whereby no portion of the connector element protrudes above the surface of the plate connector leg so that a bending open of the staple ends is prevented since no material portion of the bent over end extends above the surface of the plate connector.

According to a further embodiment of the present method, the free legs of the plate connector are bent so that they converge toward the surface of the belt, whereby a bias force is provided which tends to advantageously increase the holding force of the bent over ends of the connector elements.

In the just described second embodiment of the invention, wherein the converging legs of the U-shaped plate connectors provide a biasing force, it is possible to bend the free ends of the staples only partially through a predetermined angle or to bend these ends through a 90° angle. In any event, it is advantageous to recess the partially or completely bent over ends of the connector elements in the surface of the plate connector leg. For this purpose counter-sunk holes or the like are provided in the surface of the plate connector leg. Such counter-sunk holes in the surface of the plate connector leg are preferably so shaped as to accommodate the partially or completely bent over end of the staples so that their contour is completely recessed below the plane defining the top surface of the plate connector leg.

BRIEF FIGURE DESCRIPTION

In order that the invention may be clearly understood, it will now be described, by way of example, with reference to the accompanying drawings, wherein:

FIG. 9 shows a sectional view through the right-hand portion of FIG. 7 after the insertion of the staple through holes in the legs of the plate connector and through the belt end;

FIG. 10 is a view similar to FIG. 4 after the bending of the legs of the plate connector so that these legs converge toward the belt;

FIG. 11 is a view similar to FIGS. 9 and 10 after the severing of the bent staple ends; and FIG. 12 shows a third modification according to the invention, in a view similar to that of the preceding FIGS. 9, 10, and 11 with recesses in the plate connector legs, wherein the recesses have such a configuration that the entire length of the bent over ends of the staple is completely recessed.

DETAILED DESCRIPTION OF PREFERRED EXAMPLE EMBODIMENTS

Figure 1:
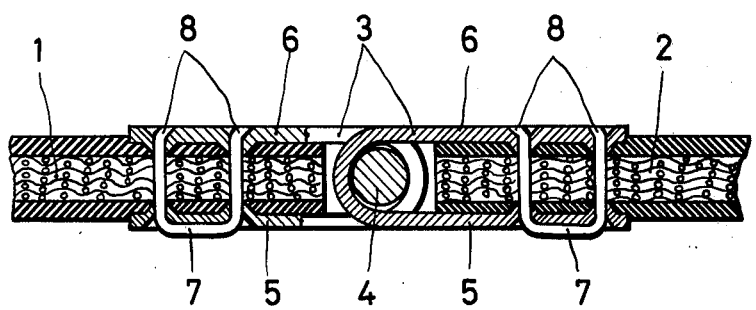
FIG. 1 is a sectional view through two conveyor belt ends which are connected with each other by means of a plate connector secured according to the invention.
Figure 2:
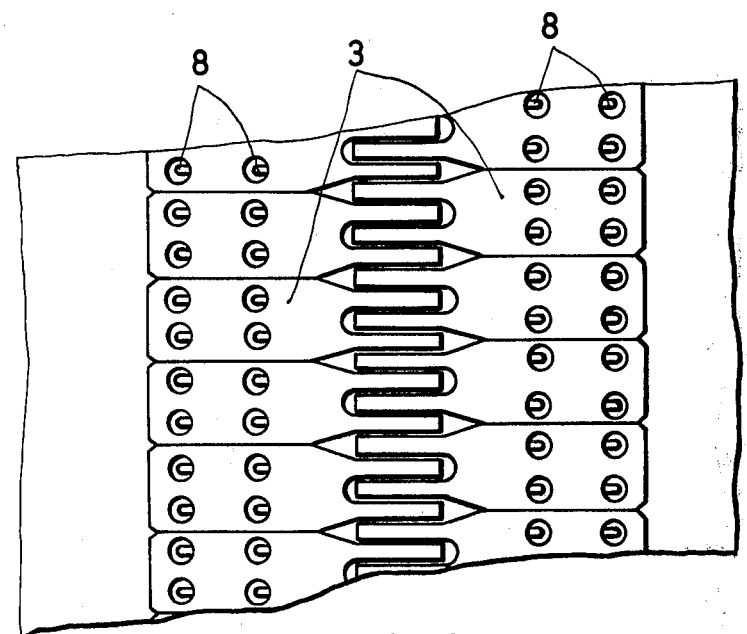
FIG. 2 is a top plan view of the plate connector according to FIG. 1.

As shown in FIGS. 1 and 2, the belt ends 1 and 2 are interconnected by means of plate connectors 3, a plurality of which are secured side by side to the ends of the respective belts. The plate connectors have spaced loops and each individual connector is so arranged along one end of a belt that its loops may reach into the spaces between the loops of the plate connectors at the opposite belt end. A coupling or locking pin 4 extends through the loops. The belt ends are received between the legs 5, 6 of the plate connectors 3. These legs are secured to the belt ends by means of staples 7 illustrated in FIGS. 1 and 2 in the final position. According to the invention, counter-sunk holes are provided in the surface of the plate connector legs so that the ends 8 of the staples 7 are bent over within these counter sunk holes and sheared off in the plane of the outer surface of the plate connector legs 6 so that these bent over ends 8 do not protrude above the outer surface of the legs 6 of the plate connector 3.

Figure 3:
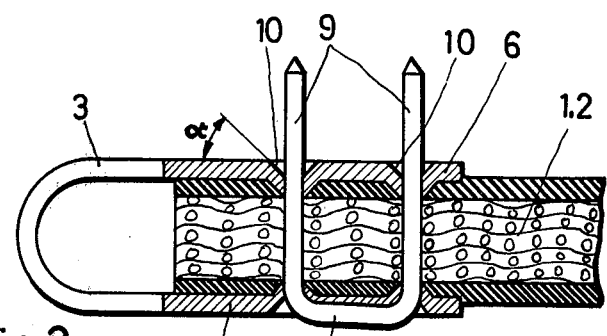
FIG. 3 illustrates a sectional view through the right-hand portion of FIG. 1 on an enlarged scale showing the position of the staple or connector element after insertion, but prior to bending.

In order to achieve the locking of the staples 7 their free ends 9 are inserted through the holes 10 in the legs of the plate connectors 3. The inner portion of the plate connector surrounding the respective hole has a conical shape which presses against the surface of the respective belt 1 or 2. The outer opening surrounding these holes is conical as mentioned and as best seen in FIG. 3. It will be appreciated, that the shape of the recess 10 surrounding the respective hole adjacent to the outer surface of the plate connector leg does not necessarily have to be conical. It is satisfactory, for example, if the recess merely extends in the direction toward the looped end of the respective plate connector to receive the bent over end 9.

Figure 4:
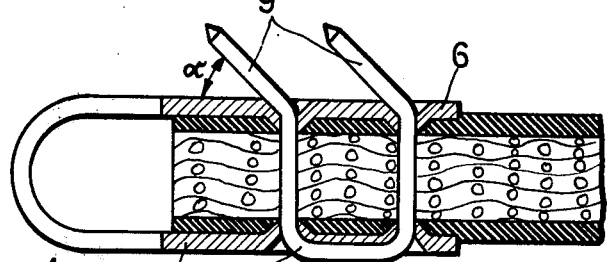
FIG. 4 is a view similar to FIG. 3, but illustrating the bent over position of the free ends of the connector element or staple.
Figure 5:
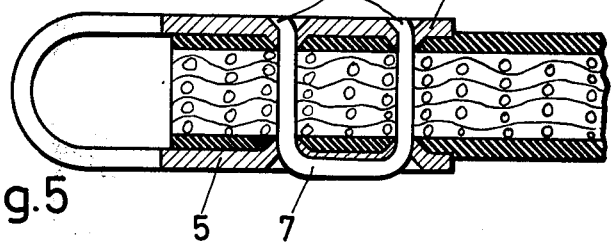
FIG. 5 is a view similar to that of FIGS. 3 and 4, but showing the staple after the severing of the protruding ends.

FIG. 4 illustrates how the free ends 9 of the staples 7 have been bent over through the angle α which, relative to the horizontal or to the plane defined by the belt, may be an angle, for example, of 45°. After the bending the outer ends are sheared off in the plane of the outer leg surface of the leg 6 as illustrated in FIG. 5.

By keeping the bent over ends 8 of the staples 7 recessed as taught by the invention, so that they do not protrude above the surface of the leg 6 of the plate connector, the danger of injury to an operator and of opening the ends of the staple is substantially eliminated. Furthermore, it is now possible to use a steel of higher strength for the staples or connector elements 7 than heretofore, because the bending characteristics are now not required to be the same as those of the staples employed heretofore. The staples that can be used according to the invention may be stiffer against bending.

Prior to inserting the staples 7 into the plate connectors 3, the lower leg 5 and the upper leg 6 of the plate connectors are tightly pressed against the belt ends 1 and 2. As the staple ends are inserted into the respective openings, they sit with a press fit in the recesses 10, the upper portion of which provides a support surface for the bent over end portion 8 of the staples 7, said support surface slanting in the same manner as the bending angle α.

Figure 6:
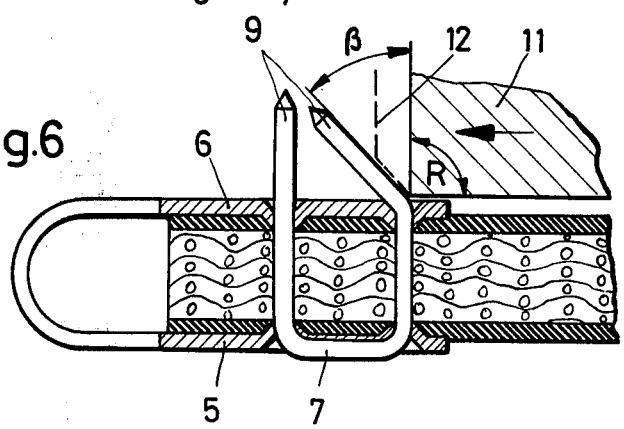
FIG. 6 is a view similar to that of FIGS. 3, 4, and 5, but also showing a shearing tool which may be provided with a bending portion.

As shown in FIG. 6 a tool 11 is used for bending over the free ends 9 of the staples 7 as it is advanced in the direction of the arrow shown in FIG. 6. After the first free end 9 has been bent to the extent indicated by the angle β, the shearing begins. As the tool then proceeds, the next free end 9 is also bent over to the extent of the angle β, whereupon the shearing begins. To achieve this sequence, the material strength of the bent over portions 8, their diameter, and the depth inside the recesses 10 are so coordinated relative to each other that the resistance of the free ends 9 as they protrude from the connector leg, as shown in FIG. 3, is initially larger against shearing than against bending. Thus, the free ends are first bent until they contact the supporting surface of the respective recess, whereupon the shearing begins. This has the advantage that bending and shearing may be accomplished in one operation. The bending and shearing tool 11 may have a working edge forming substantially a right angle R as shown in FIG. 6 where the strength of the conveyor belt is in a range having an upper limit of about 1250 (kp/cm). Where conveyor belts for higher loads are involved, the staples 7 are also selected to have higher strength whereby a tool may be employed with two working edges forming an obtuse angle as shown by the dashed line 12 in FIG. 6. The shearing edge of such a tool would be located between working surfaces forming such an obtuse angle. One working surface of such a tool 12 would extend horizontally and in parallel to the surface of the leg 6 of the plate connector, whereas the other surface would extend at the angle α as indicated by the lower portion of the dashed line in FIG. 6. By using such a tool, staples of higher strength may be bent and a safer operation is also accomplished because of the relatively blunt edge which initially contacts the side of the protruding end 9 of a staple 7. In any event, in this modification, the bending and shearing also takes place in one single operation.

Figure 7:
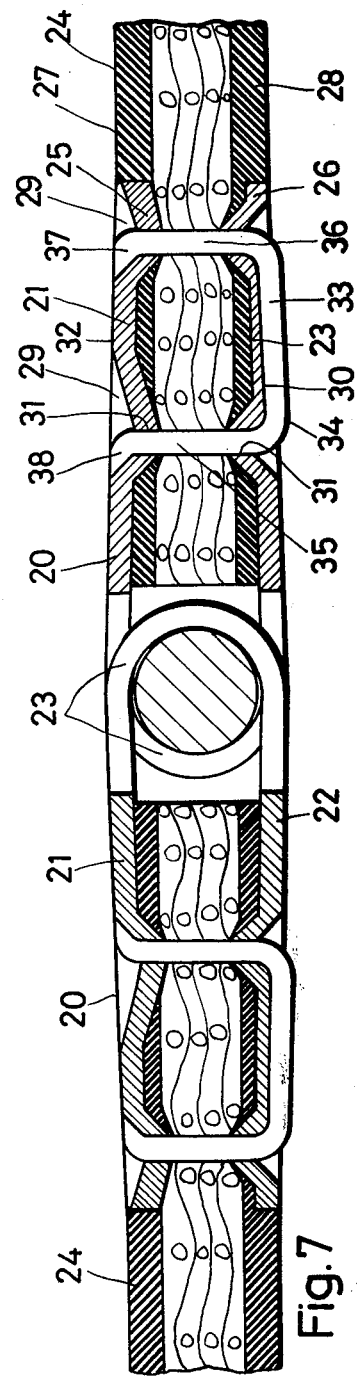
FIG. 7 is a view similar to that of FIG. 1, but illustrating on an enlarged scale, a modification of the invention wherein the legs of the plate connectors have portions converging toward the belt surfaces.
Figure 8:
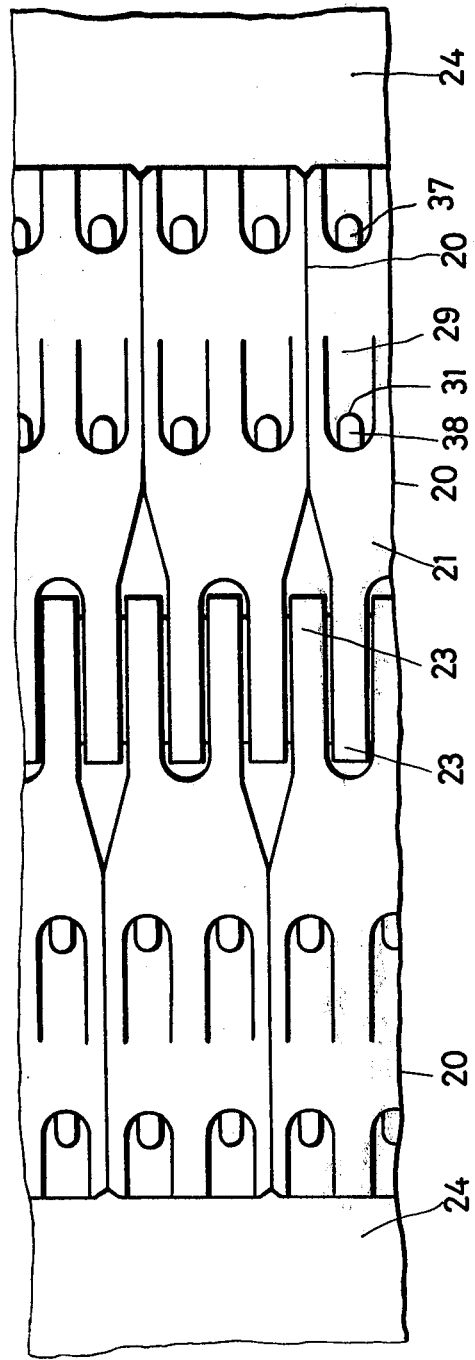
FIG. 8 is a top plan view onto an embodiment as shown in FIG. 7.

FIGS. 7 and 8 illustrate a modified plate connector 20, the legs 21 and 22 of which converge toward the belt ends 24 from the loop 23. The legs 21 and 22 are pressed into the material of the belt 24 to such an extent that the surfaces of the free ends of the legs 25 and 26 of the plate connector 20 extend at the same level as the belt surfaces 27, 28.

Depressions or recesses 29 are provided in the legs 21 of the plate connector 20. Similarly, further recesses 30 are arranged in the leg 22 of each plate connector 20. The recess 29 has a conical end portion around the hole 31 extending throught the leg 21 of the plate connector 20. The conical portion of the recess 29 merges into a slanted ramp portion, which in turn gradually merges into the surface 32 and toward the belt 24. The depression or recess 30 in the lower leg 22 of the plate connector 20 extends between the holes 31' to receive the cross member 33 of the staple 34.

The holes 31 and 31' receive the legs 35 and 36 of the staples 34 in a press fit and in a form enclosing manner. Further, the inwardly protruding portions of the legs 21 and 22 tightly grip into the material of the belt 24 around the hole 31, 31', whereby a secure anchoring between the plate connector and the belt end is assured.

FIG. 7 further illustrates that the free ends 37, 38 of the staple legs 35, 36 are bent over toward the loop 23, as best seen in the right hand portion of FIG. 7. The above described conical portion of the recesses 29 slant in the bending direction of the ends 37, 38 toward the loop 23. The depressions or recesses around the holes in the lower leg of the belt connector may also be conical, whereby the portion adjacent to the recess 30 is shorter than the outer portion to merge into the depression 30.

Similarly, the depression 29 may merge into the surface 32 of the plate connector leg 21 or it may merge toward the free end 25 of the plate connector leg 21.

The production and essential features of the plate connector according to FIGS. 7 and 8 will now be described with reference to FIGS. 9-11. Referring to FIG. 9, the staple 34 is first inserted with its legs 35 and 36 into the openings 31' and through the belt end as well as through the holes 31 in the legs of the plate connector 20. The holes 31' and the holes 31 are aligned with each other axially and the size of the holes is such that the legs 35 and 36 extend with a press fit through the holes, and the longitudinal center axes of the legs are aligned with the axis of the registering holes. The legs 21 and 22 of the plate connector 20 extend substantially in parallel to each other. As shown in FIG. 10, the parallel legs 21 and 22 of the plate connector 20 are pressed against the belt 24 to such an extent that the free ends 25 and 26 of the plate connector substantially extend flush with the adjacent surfaces 27, 28, respectively, of the belt 24. As a result of this pressing of the legs 21 and 22 toward the belt, these legs converge, whereby simultaneously the longitudinal, registering axis of the holes 31, 31' are slanted or bent relative to the longitudinal axis of the free ends 35, 36 of the staples 34, whereby the press fit or biasing between the legs 35, 36 and the belt, as well as the legs 21, 22 is increased. This feature has the advantage that the biasing force tends to counteract the pressures to which the staple legs are subject under load conditions when the conveyor belt is in operation. As a result, the staples 34 are secured to the belt end with a larger safety margin than in the first described embodiment. This is so, because any change in the bearing pressure which would cause a permanent deformation of the staple in the area of the openings 31, 31', can occur only after the bearing pressure due to the biasing force is exceeded.

The bending and shearing of the protruding ends 35, 36 as illustrated in FIGS. 9, 10, and 11, takes place in the same manner as has been described above with reference to FIGS. 4, 5, and 6.

FIG. 12 illustrates a further embodiment according to the invention, in which the legs 39 and 40 also converge toward the belt 41 as in the second embodiment. However, the recesses 29 which gradually merge into the surface of the connector legs as shown in FIGS. 7-11 are replaced in FIG. 12 by a longitudinal recess 42 in the upper leg 39 of the connector 45. The recess 42 has a constant depth sufficient to fully receive the bent over ends 35, 36 with the tips 43, 44 of the staple 34 which have not been cut off. The depth of the recess 42 is such that the outer contour of the bent over ends 35, 36 does not protrude above the outer surface of the upper leg 39 of the plate connector 45.

With regard to to FIGS. 7-11 it should be mentioned that this embodiment is especially advantageous because the gradual slope of the recess 29 assures an especially efficient force transmission.

Although the invention has been described with reference to specific example embodiments, it will be appreciated, that it is intended to cover all modifications and equivalents within the scope of the appended claims.

I claim:

1. In a method for securing a plate connector to the end of a conveyor belt by means of securing elements extending transversely through the belt and through respective apertures in the plate connector which has recesses with a slanted side wall in at least one of its surfaces facing away from the belt, the improvement comprising inserting said securing elements through said belt and apertures so that the free ends of said securing elements extend beyond the opposite surface of said plate connector, fastening the securing elements to the plate connector by bending said extending free ends at an angle $\alpha$ with respect to the plane of said belt so that a portion of the bent part of each securing element is within the respective recess and against the slanted recess side wall, whereby a rivet type fastening is achieved, and then severing said securing elements in a plane substantially coinciding with the surface of said plate connector so that said plate connector surface acts as a counter edge for the severing, whereby the free ends of said securing elements terminate within the respective recess and substantially flush with the respective surface of said plate connector.

2. The method of claim 1, wherein said apertures in said plate connector merge into said recesses which are counter-sunk holes in said one surface of the plate connector, said step of bending comprising bending the extending end of said securing elements against a side of the respective counter-sunk hole.

3. The method of claim 1, wherein said securing elements comprise staples, said step of bending comprising bending each free end of said staples through said angle $\alpha$ prior to said severing.

4. A method for securing U-shaped plate connectors to the free ends of a conveyor belt, wherein each plate connector extends with its legs around the respective free end of the conveyor belt to engage both surfaces adjacent to the respective conveyor belt end, comprising inserting a free belt end between the initially substantially parallel legs of the U-shaped plate connector which has recesses with a slanted side wall in at least one surface facing away from the belt, inserting staples with a press fit through holes in the legs of the U-shaped plate connector and in the belt end so that the free ends of the staples protrude from said one surface of the U-shaped plate connector and through a respective one of said recesses, pressing the legs of the U-shaped plate connector toward the belt so that the legs of the U-shaped plate connector converge toward the respective belt surface whereby said press fit is increased while the free ends of the staples protrude from said recesses of the plate connector, and then bending the protruding ends of said staples in the direction toward the respective belt end and against the slanted side wall of the respective recess extending toward the belt end, whereby a rivet type fastening is achieved.

5. The method of claim 4, wherein said step of bending said protruding staple ends comprises bending the staple ends through an angle of 90°.

6. The method of claim 4, wherein said staples are bent through an angle $\alpha$ with respect to the plane of the conveyor belt, and then severing said staple ends in a plane substantially coinciding with the surface of said U-shaped plate connector, whereby the connector surface acts as a counter edge for the severing.

7. The method of claim 1, comprising using as said plate connector a U-shaped plate connector means including legs extending around said belt end, said U-shaped plate connector means having said recesses located in said legs, said securing elements extending transversely through said belt end.

8. The method of claim 7, wherein said securing elements comprise staples having free ends each terminating in its respective recess, whereby the free ends of a staple are arranged in line longitudinally of the conveyor belt.

9. The method of claim 8, wherein said staples have inclined ends, said recesses having sides inclined in the same direction as said inclined staple ends to engage said inclined ends of said staples to facilitate said rivet type fastening.

10. The method of claim 7, comprising making said recesses in said plate connectors to have a conical shape.

11. The method of claim 7, comprising locating said recesses in the outside surface of the legs of said U-shaped plate connector.

12. The method of claim 7, comprising providing said recesses in at least that leg of the U-shaped plate connector through which said securing elements extend with a protruding free end, and wherein the recesses are provided with a conical area and with a ramp area, whereby the conical area merges into said ramp area and the latter merges into the surface or end of said plate connector.

13. The method of claim 7, comprising providing said recesses with such a shape and size in the surface of said plate connector as to receive the full length of a completely bent over free end of said securing means.

* * * * *